(12) United States Patent
Rizk et al.

(10) Patent No.: US 7,606,017 B2
(45) Date of Patent: Oct. 20, 2009

(54) PROTECTION DEVICE: SURGE SUPPRESSING CONDUCTOR

(76) Inventors: Farouk A. M. Rizk, 98 De la Moselle, Saint-Lambert, Quebec (CA) J4S 1W2; Amr Rizk, 98 De la Moselle, Saint-Lambert, Quebec (CA) J4S 1W2

( * ) Notice: Subject to any disclaimer, the term of this patent is extended or adjusted under 35 U.S.C. 154(b) by 336 days.

(21) Appl. No.: 11/712,912

(22) Filed: Mar. 2, 2007

(65) Prior Publication Data
US 2007/0217113 A1    Sep. 20, 2007

(51) Int. Cl.
H02H 1/04 (2006.01)
H02H 3/22 (2006.01)
H01T 19/00 (2006.01)
H01B 5/00 (2006.01)

(52) U.S. Cl. .................. 361/117; 361/118; 361/231; 174/127

(58) Field of Classification Search ........... 361/117, 361/118, 231; 174/127
See application file for complete search history.

(56) References Cited

U.S. PATENT DOCUMENTS

| | | |
|---|---|---|
| 3,609,218 A | 9/1971 | Herb et al |
| 3,825,671 A | 7/1974 | Pokorny |
| 3,930,113 A | 12/1975 | Johansen et al. |
| 4,180,698 A | 12/1979 | Carpenter, Jr. |
| 4,458,107 A | 7/1984 | Heroux |
| 4,605,814 A | 8/1986 | Gillem |
| 4,679,114 A | 7/1987 | Carpenter, Jr. |
| 4,910,636 A | 3/1990 | Sadler |
| 5,043,527 A | 8/1991 | Carpenter, Jr. |
| 5,073,678 A | 12/1991 | Carpenter, Jr. |
| 5,932,838 A | 8/1999 | Carpenter, Jr. |
| 6,017,628 A | 1/2000 | Stevens et al. |
| 6,069,314 A | 5/2000 | Varela |

(Continued)

FOREIGN PATENT DOCUMENTS

CA    1205514    6/1986

(Continued)

OTHER PUBLICATIONS

AC Corona in Foul Weather I—Above Freezing Point, IEEE Transactions (PAS), vol. 83, May 1964, pp. 508-512).*

(Continued)

*Primary Examiner*—Stephen W Jackson
*Assistant Examiner*—Scott Bauer
(74) *Attorney, Agent, or Firm*—Goudreau Gage Dubuc; Gonzalo Lavin

(57) ABSTRACT

A lightning protection or internal surge device designed to suppress surges on electrical transmission or distribution lines by expending some of the excess energy in the form of corona discharge in both wet and dry conditions. The device is a very thin (of diameter not exceeding 0.1 mm) conducting wire, fiber, filament, or a bundle of such filaments, or a yarn or woven or knitted fabric made of such fibers or wires which is wound around a live conductor or ground wire forming a coil. When the coil is exposed to the fields created by the voltage surges on the line or ground wire it enhances corona losses on the line thereby damping/suppressing the surges as well as prolonging the front time of the surge to reduce its steepness.

8 Claims, 3 Drawing Sheets

U.S. PATENT DOCUMENTS

| | | | |
|---|---|---|---|
| 6,307,149 | B1 | 10/2001 | Zini et al. |
| 6,320,119 | B1 | 11/2001 | Gumley |
| 7,236,341 | B1 | 6/2007 | Carpenter |
| 2003/0067731 | A1 | 4/2003 | Kent |
| 2003/0103311 | A1 | 6/2003 | Zhuang |
| 2004/0130842 | A1 | 7/2004 | Johansen |
| 2004/0251700 | A1 | 12/2004 | Hesse |
| 2005/0146832 | A1 | 7/2005 | D'Alessandro |
| 2007/0115607 | A1 | 5/2007 | Rizk et al. |

FOREIGN PATENT DOCUMENTS

| | | |
|---|---|---|
| CA | 2543551 | 6/2005 |
| EP | 0488695 | 6/1992 |

OTHER PUBLICATIONS

Voprosy Podavlenja Radiopomiech Ot Kornonovo Razriada, W.I. Popkow. Izvestia Akademii Hauk SSSR, Energetika I Avtomatika. Moscow, USSR, No. 4, 1961, p. 64.*

Farouk A.M. Rizk, Modeling of Lightning Incidence to Tall Structure Part I: IEEE Trans. on Power Delivery, Canada, Jan. 1994, vol. 9, No. 1, pp. 162-171.

Farouk A.M. Rizk, Modeling of Lightning Incicdence to Tall Structure Part II: IEEE Trans. on Power Delivery, Canada, Jan. 1994, vol. 9, No. 1, pp. 172-193.

Farouk A.M. Rizk, A model for Switching Impulse Leader Inception and Breakdown of Long Air-Gaps: IEEE Trans. on Power Delivery, Canada, Jan. 1989, vol. 4, No. 1, pp. 596-606.

Farouk A.M. Rizk, Switching Impulse Strength of Air Insulation: Leader Inception Criterion: IEEE Trans. on Power Delivery, Canada, Oct. 1989, vol. 4, No. 4, pp. 2187-2195.

Farouk A.M. Rizk, Influence of Rain on Switching Impulse Sparkover Voltage of Large Electrode Air-Gaps: IEEE Trans. on Power Apparatus and Systems, Canada, Jul./Aug. 1976, vol. PAS-95, No. 4, pp. 1394-1402.

Farouk A.M. Rizk, Modeling of Transmission Line Exposure to Direct Lightning Strokes: IEEE Trans. on Power Delivery, Canada, Oct. 1990, vol. 5, pp. 1983-1997.

C.A.E. Uhlig, "The Ultra Corona discharge, A New Discharge Phenomenon Occuring on Thin Wires", Proceedings of High Voltage Symposium, National Research Council of Canada, Ottawa, 1956, paper No. 15.

C.A.E. Uhlig, "A.C. Corona Current and Loss on Thin Wires from Onset to Sparkover", Proceedings of High Voltage Symposium, National Research Council of Canada, Ottawa, 1956, paper No. 16.

V.I. Popkov, "Some Special Features of Corona on High-Voltage DC Transmission Lines", in Gas Discharges and the Electric Supply Industry, Proceedings of International Conference, CERL, Leatherhead, surry, England, May 1962, pp. 225-237.

N.G. Trinh, J.B. Jordan, "Modes of Corona Discharge in Air", IEEE Trans, May 1968, vol. PAS-87, No. 5, pp. 1207-1215.

P. Heroux. P.S. Maruvada, M.G. Trinh, "High voltage AC Transmission Lines: Reduction of Corona Under Foul Weather" IEEE Trans., Canada, Sep. 1982, vol. PAS-101, No. 9, pp. 3009-3017.

* cited by examiner

PROTECTION DEVICE: SURGE SUPPRESSING CONDUCTOR

FIELD OF THE INVENTION

The present invention relates to a lightning protection device.

BACKGROUND OF THE INVENTION

When an electrical conductor is struck by lightning, current and associated voltage waves travel in opposite directions along the lines towards terminal substations. These voltage waves are generally characterized by steep fronts and high amplitudes. The amplitude of the impinging wave is eventually limited by a lightning arrester. The steepness of the impinging wave on the other hand is practically determined by the corona characteristics of the line and the travel distance from the strike point to the substation and is not influenced by the arrester.

For a given distance between the arrester and protected equipment, the maximum steepness determines the necessary protection margin above the arrester protective level. Furthermore for insulated windings a steep impulse generally leads to unfavourable voltage stress of the insulation.

It is to be noted that overvoltages in electrical transmission systems may also be caused by internal switching operations that are not caused by lightning.

BACKGROUND OF THE PRIOR ART

Lightning arresters are devices that are connected across equipment to be protected. They are designed to clip off voltage peaks caused by the lightning stroke or to divert that part of the surge energy associated with voltage levels that exceed the protective level of the arrestor thereby protecting the equipment. They are not designed to slow down the steep impulse front.

STATEMENT OF THE OBJECT OF THE INVENTION

To provide a low cost compliment to the existing surge protection systems for electrical transmission and distribution lines and substations and to enhance their effectiveness.

To provide a low cost surge protection system that can be mounted directly onto any electrical transmission/distribution line.

To slow down the steep impulse front and attenuate the voltage amplitude through increased corona losses while maintaining, under operating voltage, an absence of the corona current pulses which are the main cause of radio interference (RI) and audible noise (AN).

SUMMARY OF THE INVENTION

According to the present invention, there is provided a lightning or internal surge protection device for suppressing surges on an electrical conductor line of an electrical transmission or distribution network, comprising:

pulse-less corona producing conductors wound around the electrical conductor line and forming coils, each pulse-less corona producing conductor having a diameter not exceeding 0.1 mm for reducing a corona inception voltage of the electrical conductor line upon which each conductor is wound, in both dry and wet conditions.

According to another aspect of the present invention, there is provided a method of making a lightning or internal surge protection device for suppressing surges on an electrical conductor line of an electrical transmission or distribution network, comprising a step of:

winding pulse-less corona producing conductors around the electrical conductor line to form coils, each pulse-less corona producing conductor having a diameter not exceeding 0.1 mm for reducing a corona inception voltage of the electrical conductor line upon which each conductor is wound, in both dry and wet conditions.

Preferably, the lightning protection device is designed to limit surges on electrical transmission and distribution lines. The device includes a corona producing element which is made of a very thin (diameter not exceeding 0.1 mm) conducting wire or fiber or filament. Such filaments or wires may also be stranded or assembled into bundles of filaments, yarn, woven or knitted into a fabric and as result the form of the corona producing element may be constructed to meet any practical tensile strength requirements despite the small diameter of the wire or fiber. The corona producing element is wound around the electrical transmission or distribution conductors or ground wires forming a coil.

The coil may even be mounted onto an overhead conductor while the conductor is in service.

These thin conductors have the effect of substantially reducing the corona inception voltage of the supporting conductor, increasing the rate of corona charge production in both dry and wet conditions and enhancing the range of steepness of transient voltages under which ultra-corona production is maintained. Thus for any voltage above corona inception level, corona energy losses are enhanced. When surges appear on the line where the coils are present, some of the energy of the surge will be dissipated in the form of corona losses, thereby reducing stresses on lightning arresters and arrester protected equipment and suppressing surges at locations where lightning arresters are not effective. This effect is brought about by slowing down the steep impulse front and damping the prospective impulse amplitude.

For distribution lines whose operating voltage is below the corona inception of the modified conductor, the cladding can in principle be applied anywhere along the length of the line where serious overvoltages may appear due to external or internal causes. Lighting is generally identified as the most serious external cause of overvoltages. However, overvoltages may originate internally, for example in different switching operations of electrical transmission or distribution networks.

In the case of transmission lines whose operating voltage exceeds the corona inception of the cladded power conductor, the modified power conductor will constantly produce some pulse-less corona due to the line voltage thereby producing energy losses. Therefore in order to limit the extent of losses under normal operating conditions it is only advisable to use the special cladding in the few kilometres that precede a substation or any installation with expensive equipment. Under normal operating conditions, the suppressor maintains an absence of the current pulses which are the main cause of radio interference (RI) and audible noise (AN) and still provides means of suppressing and slowing down surges on the conductors.

The cladding may be applied to overhead ground wires anywhere along the line where overvoltages may appear with no power loss due to line voltages. Furthermore since a reduced corona inception means an increase in corona charge per unit length, the use of the cladding on an overhead ground wire will increase the equivalent capacitance per unit length of the ground wire. This in turn will increase the capacitive coupling to the phase conductors and reduce the resulting stress on the insulator string. This will have the effect of reducing the probability of back flashover.

According to IEC 71-2, if an object (e.g. a power transformer) is protected by a lightning arrestor, the lightning overvoltage $U_{rp}$ applied to the object is related to the arrester protective level $U_{pi}$ by $$U_{rp}=U_{pi}+2ST$$

where
S: is the steepness of the impinging lightning surge
T: is the travel time of lightning between the arrester and the protected object The time T is basically determined by the distance between the arrester and the protected object as well as the length of the arrester HV lead and ground connection. For a given distance and arrester lead length and with the maximum design steepness S, the term 2ST is fundamental in determining the margin between the required insulation level of the protected object and the protective level of the lightning arrestor. It follows that a steepness exceeding the design value would endanger the safety of the protected object by reducing the protective margin. Such steepness occurs when lightning strikes within the last few transmission line spans from the substation.

The application of surge suppressing conductors that reduce the steepness S will:

Improve the safety margin of the protected object which is expected to translate into less repairs and an extended life span Extend the protection effect for longer distances around the lightning arrester.

Furthermore since S is presently determined by corona on bare conductors and an assumed minimum distance of a lightning strike from the substation, the suppressor will reduce the minimum acceptable distance of a lightning strike to the substation. Also applying surge suppressing overhead conductors on 1 or 2 km of transmission line length will be far less expensive than either increasing the insulation level of the protected object (transformer) to achieve the same effect or introducing line arrestors.

The use of the Wet/Dry Glow-Based Surge Suppressor could be of great interest wherever the spurious tripping of protective relays due to surges from lightning strikes is of concern. Nuclear installations or any other installations with sensitive control and monitoring equipment are prime candidates.

The invention as well as its numerous advantages will be better understood by reading of the following non-restrictive description of preferred embodiments made in reference to the appended drawings.

DESCRIPTION OF PREFERRED EMBODIMENTS

Figure 1A:
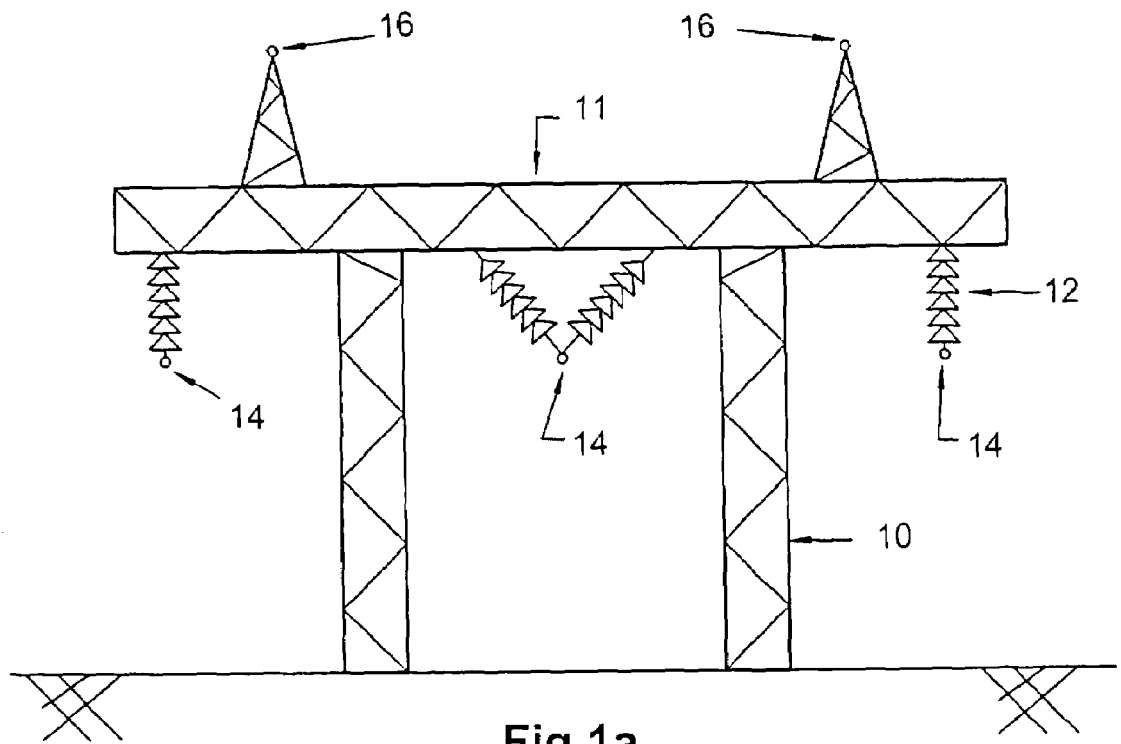
FIG. 1a is a sectional view of an electrical transmission line tower with power conductors and overhead ground wires that are fitted with a wet/dry glow-based surge suppressing coil, according to a preferred embodiment of the present invention.

Referring to FIG. 1a, there a shown a part of an electrical transmission network having a tower 10, a portal 11, insulating strings 12, power conductors 14 and an overhead ground wires 16, wherein the present invention may be used.

Figure 1B:
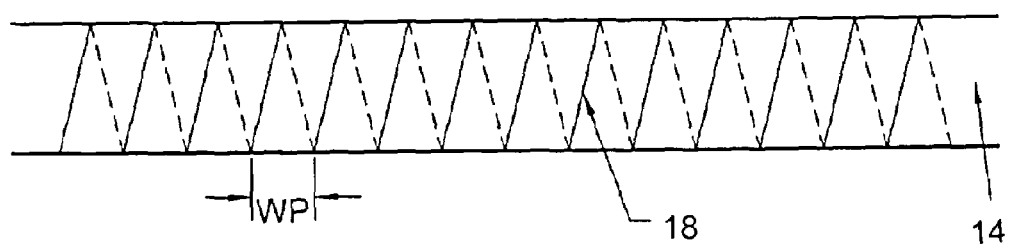
FIG. 1b is a partial side sectional view of a pulse-less corona producing element, a very thin conducting wire or fiber or filament or bundles of filaments, yarn, knitted or woven fabric made of such conducting fibers which is wound around a live electrical conductor or ground wire forming a wet/dry glow-based surge suppressor, according to a preferred embodiment of the present invention.

Referring to FIG. 1b, the power conductors 14 and overhead ground wires 16 (shown in FIG. 1a), which are more generally termed electrical conductor lines, are fitted with a wet/dry glow-based surge suppressing coil, according to a preferred embodiment of the present invention. The coil is made of pulse-less corona producing conductors 18 wound around the electrical conductor line. Each pulse-less corona producing conductor 18 has a diameter not exceeding 0.1 mm for reducing a corona inception voltage of the electrical conductor line upon which each conductor is wound, in both dry and wet conditions. The conductors 18 or the like may be wound around a live power conductor 14 at a given winding pitch defining a winding pitch distance WP.

In the case of transmission lines whose operating voltage exceeds the corona inception of the coil, the coil will constantly produce some pulse-less corona due to the line voltage thereby producing energy losses. Therefore it is only advisable to use the coils in the few kilometres that precede a substation or any installation with expensive equipment thereby limiting the extent of losses under normal conditions and still providing means of suppressing and slowing down surges on the conductors.

Figure 2A:
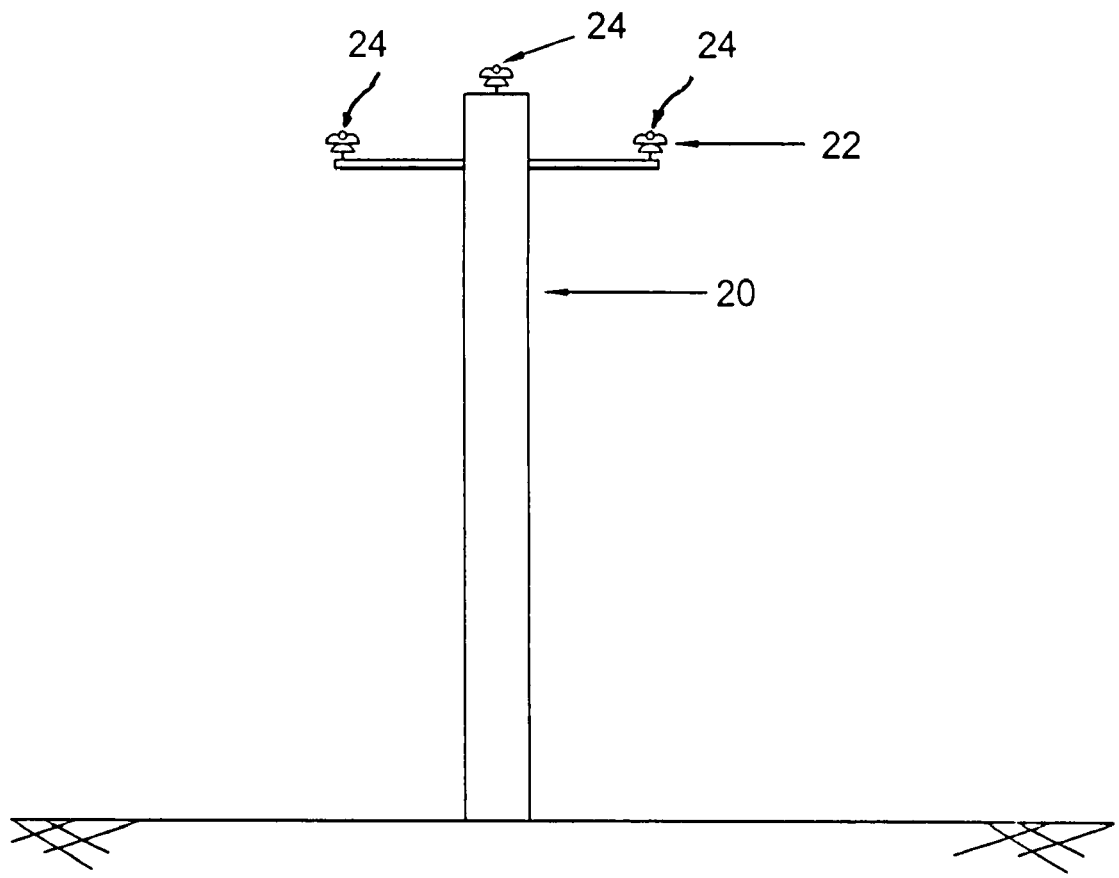
FIG. 2a is a sectional view of an electrical distribution line pole with power conductors that are fitted with the wet/dry glow-based surge suppressing coil, according to a preferred embodiment of the present invention.

Referring to FIG. 2a, there is shown a part of an electrical distribution network having an electrical distribution line pole 20, pin type insulators 22, and power conductors 24, wherein the present invention may be used.

Figure 2B:
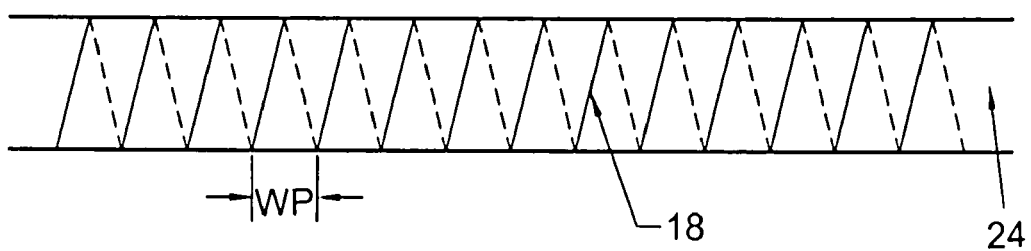
FIG. 2b is a partial side sectional view of a pulse-less corona producing element, a very thin conducting wire or fiber or filament or bundles of filaments, yarn, knitted or woven fabric made of such conducting fibers which is wound around a live electrical conductor forming a wet/dry glow-based surge suppressor, according to a preferred embodiment of the present invention.

Referring to FIG. 2b, the power conductors 24, which are more generally termed electrical conductor lines, are fitted with a wet/dry glow-based surge suppressing coil, according to a preferred embodiment of the present invention. The coil is made of pulse-less corona producing conductors 18 wound around the electrical conductor line. Each pulse-less corona producing conductor 18 has a diameter not exceeding 0.1 mm for reducing a corona inception voltage of the electrical conductor line upon which each conductor is wound, in both dry and wet conditions. The conductors 18 or the like may be wound around a live power conductor 24 at a given winding pitch defining a winding pitch distance WP.

In the case of distribution lines whose operating voltage is below the corona inception of the coil, the coil can in principle be wound anywhere along the length of the line where serious overvoltage may appear due to external or internal causes.

Figure 3:
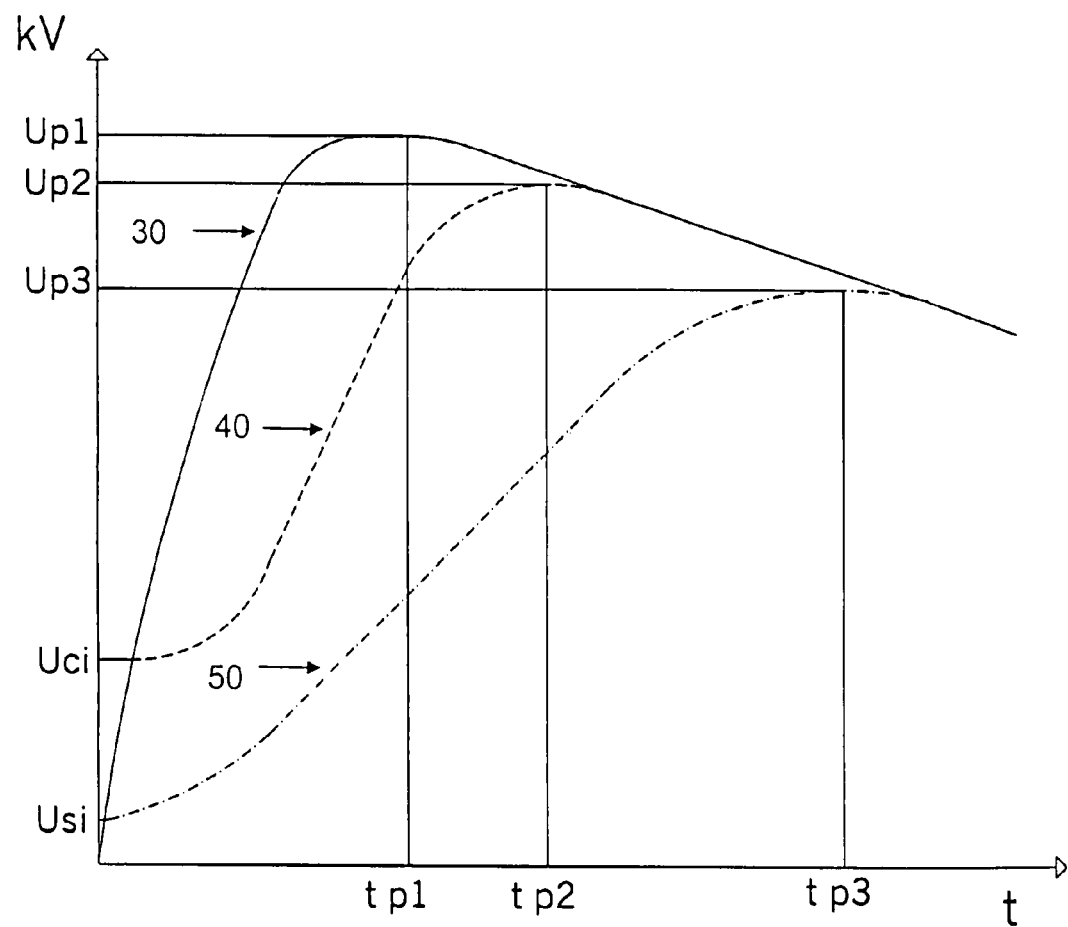
FIG. 3 is a graph of curves showing the influence of a surge suppressor on the lightning impulse peak voltage and front steepness, according to a preferred embodiment of the present invention.

Referring to FIG. 3, there is shown graph of curves showing the influence of a surge suppressor on the lightning impulse peak voltage and front steepness. The top curve 30 represents a prospective incoming voltage wave neglecting corona. The middle curve 40 represents a voltage wave damped due to normal corona on transmission line. The bottom curve 50 represents a voltage wave damped due to enhanced glow of suppressor, according to a preferred embodiment of the present invention. In the graph, Up1 represents the prospective peak of the initial wave, tp1 is the prospective time-to-peak of the initial voltage wave, Up2 is the voltage peak influenced by a normal conductor corona, tp2 is the time-to-peak due to normal conductor corona, Uci is the normal corona inception voltage, Up3 is the voltage peak due to the application of a suppressor, tp3 is the time to peak due to the application of the suppressor, and Usi is the corona inception voltage due to the application of the suppressor.

SUMMARY OF LABORATORY TESTS

Between Jan. 23 and 31 of 2006 Expodev Inc. prepared a test program, commissioned and witnessed two series of experiments at IREQ's High Voltage Laboratory. The objective of the tests was to determine the effect that the use of thin conductors of less than 0.1 mm wound around a toroidal electrode for Lightning Protection would have on:

- The corona inception voltage of the toroidal electrode constructed from a circular cylindrical conductor;
- The production of impulsive currents (streamers) versus DC currents (glow-mode corona);
- The breakdown voltage of a 1.5 meter double toroid-plane air gap where the test electrodes served as the anode.

A number of identical stainless steel test electrodes were constructed, each electrode consisted of two toroids whose major diameters are one meter and whose minor diameters are 2.54 cm (one inch) and the toroids are mounted 30 cm (12 inches) apart, symmetrically on a stainless steel frame. One double toroid test electrode was left bare and served as the "control" while the other test electrodes were wound with conductors of less than 0.1 mm around the toroidal electrode.

The tests were carried out in the High Voltage Test Hall and the source was a high voltage DC 1200 kV cascade. In the first series of experiments the test electrodes were mounted 3.5 m above ground on a vertical aluminium pole of diameter 10 cm (4 inches). A conducting plate of approximately 6 m diameter was suspended above the test electrodes at a height of 5 meters above ground or 1.5 meters above the test electrode. Each electrode was tested separately under direct voltage (DC) in both dry and thoroughly wetted conditions. The voltage of the conducting plate was raised to negative 600 kV in approximately 45 seconds and we took note of the corona inception voltage (through measurements of high speed and glow current flow as well as the monitoring of visible discharges, UV radiation and audible noise), the voltage was held at 600 kV for one minute and then raised until breakdown. The current was measured with a leakage current monitoring system (20 kHz) as well as with two high speed oscilloscopes (band width in the MHz range) with coaxial cables terminated by their surge impedance.

It was noted that for the dry bare "control" electrode the corona inception voltage was approximately 400 kV and the breakdown voltage of the 1.5 meter gap was approximately 650 kV. Furthermore it was producing significant streamer activity from 400 kV up until breakdown. When the same electrode was thoroughly wetted with tap water the corona inception voltage was approximately 250 kV with little change in the breakdown voltage and significant streamer activity.

However when the test electrodes were provided with conductors of less than 0.1 mm wound around a toroidal electrode and they were exposed to the same conditions, there were significant differences observed. The corona inception voltage both dry and thoroughly wetted with tap water was reduced to as low as 150 kV. The breakdown voltage of the gap was increased by approximately 180 kV and at a plane electrode voltage of 600 kV the electrode produced a DC current as high as 1.7 mA or it produced space charge at a rate of approximately 1.7 mC/s. Furthermore the electrodes produced no streamers, at all, right up until a negative streamer initiated breakdown from the 6 m conducting plate, as seen on the UV camera, under both dry and thoroughly wet electrode conditions.

In the second series of tests the test electrodes were connected directly to a positive DC 1200 kV source and suspended upside down 3.5 meters above a large steel plate grounded through a current measuring shunt. The voltage was raised in steps up to 800 kV, current and charge measurements as well as visible discharge, UV radiation and audible noise observations were made during each voltage plateau. It was observed that the bare test electrode had significant streamer activity under both dry and thoroughly wetted conditions but that once again, preparation of the electrodes with conductors of less than 0.1 mm wound around a toroidal electrode eliminated any streamer activity and produced significant amounts of space charge. The second test series was not designed to reach breakdown of the gap.

The above tests confirmed that for a cylindrical conductor the corona current can be expresses as:

$$i = AV(V - V_{ci})$$

where

V is the applied voltage $V_{ci}$ is the corona inception voltage

A is a constant independent of voltage

Application of the ultra-corona producing elements had two significant effects:

1. The corona inception voltage, for the same conductor diameter, height above ground etc is reduced by approximately a factor of 3.
2. The constant A in the above expression is approximately 1.5 to 2 times higher for the modified, cladded conductor in the wide voltage range investigated.

Both these effects will be greatly beneficial for the surge suppressing capability of the invented conductor.

It should be noted that neither repeated sparkovers in the High Voltage laboratory, handling by laboratory personnel nor exposure to a full Canadian Winter over two seasons had any observable effect on the treated electrodes.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. A lightning or internal surge protection device for suppressing surges on an electrical conductor line of an electrical transmission or distribution network, comprising:
   pulse-less corona producing conductors wound around the electrical conductor line and forming coils, each pulse-less corona producing conductor having a diameter not exceeding 0.1 mm for reducing a corona inception voltage of the electrical conductor line upon which each conductor is wound, in both dry and wet conditions.

2. The protection device of claim 1, wherein the pulse-less corona producing conductors are selected from the group including a conducting wire, a bundle of conducting wires, a conducting fiber, a conducting filament, a bundle of conducting filaments, a yarn made of conducting wires, a yarn made of a bundle of conducting wires, a yarn made of conducting fibers, a yarn made of conducting filaments, a yarn made of a bundle of conducting filaments, a knitted fabric made of conducting wires, a knitted fabric made of a bundle of conducting wires, a knitted fabric made of conducting fibers, a knitted fabric made of conducting filaments, a knitted fabric made of a bundle of conducting filaments, a woven fabric made of conducting wires, a woven fabric made of a bundle of conducting wires, a woven fabric made of conducting fibers, a woven fabric made of conducting filaments, a woven fabric made of a bundle of conducting filaments, and wherein each of said wires, fibers and filaments has a diameter not exceeding 0.1 mm.

3. The protection device of claim 2, wherein the conductors are firmly attached to and wound around the electrical conductor line in single or multiple layers to form a continuous or sectionalized electric coil.

4. The protection device of claim 3, wherein the electrical conductor line is an overhead ground wire.

5. The protection device of claim 3, wherein the electrical conductor line is a live electrical conductor.

6. A method of making a lightning or internal surge protection device for suppressing surges on an electrical conductor line of an electrical transmission or distribution network, comprising a step of:

winding pulse-less corona producing conductors around the electrical conductor line to form coils, each pulse-less corona producing conductor having a diameter not exceeding 0.1 mm for reducing a corona inception voltage of the electrical conductor line upon which each conductor is wound, in both dry and wet conditions.

7. The method according to claim 6, wherein the pulse-less corona producing conductors are selected from the group including a conducting wire, a bundle of conducting wires, a conducting fiber, a conducting filament, a bundle of conducting filaments, a yarn made of conducting wires, a yarn made of a bundle of conducting wires, a yarn made of conducting fibers, a yarn made of conducting filaments, a yarn made of a bundle of conducting filaments, a knitted fabric made of conducting wires, a knitted fabric made of a bundle of conducting wires, a knitted fabric made of conducting fibers, a knitted fabric made of conducting filaments, a knitted fabric made of a bundle of conducting filaments, a woven fabric made of conducting wires, a woven fabric made of a bundle of conducting wires, a woven fabric made of conducting fibers, a woven fabric made of conducting filaments, a woven fabric made of a bundle of conducting filaments, and wherein each of said wires, fibers and filaments has a diameter not exceeding 0.1 mm.

8. The method according to claim 6, wherein the step comprises steps of selecting a given winding pitch of the coils formed by the pulse-less corona producing conductors and selecting a given length of the pulse-less corona producing conductors wound around the support structure to control a rate of space charge that is produced in the proximity of the electrical conductor line.

* * * * *